United States Patent [19]

Ikeda

[11] 4,310,076
[45] Jan. 12, 1982

[54] SLIDING CALIPER DISC BRAKE
[75] Inventor: Mituo Ikeda, Chiryu, Japan
[73] Assignee: Aisin Seiki Kabushiki Kaisha, Kariya, Japan
[21] Appl. No.: 72,744
[22] Filed: Sep. 5, 1979
[30] Foreign Application Priority Data
  Sep. 8, 1978 [JP] Japan ............... 53-110884
[51] Int. Cl.³ .............................. F16D 65/00
[52] U.S. Cl. .................... 188/73.35; 188/73.45; 188/205 A
[58] Field of Search ............... 188/73.3, 73.6, 205 A, 188/205 R, 206, 216

[56] References Cited
U.S. PATENT DOCUMENTS

| 3,388,774 | 6/1968 | Burnett | 188/205 A X |
| 3,841,445 | 10/1974 | Rinker | 188/73.5 |
| 3,841,446 | 10/1974 | Gravel, Jr. | 188/73.5 |
| 4,093,044 | 6/1978 | Unterberg | 188/73.3 |

FOREIGN PATENT DOCUMENTS

| 2211429 | 9/1972 | Fed. Rep. of Germany . |
| 2707058 | 8/1977 | Fed. Rep. of Germany . |
| 1347011 | 1/1966 | France . |
| 2284800 | 9/1974 | France | 188/73.3 |
| 1366446 | 9/1974 | United Kingdom | 188/73.5 |
| 1416122 | 12/1975 | United Kingdom . |
| 1443544 | 7/1976 | United Kingdom . |
| 1473933 | 5/1977 | United Kingdom . |
| 1476001 | 6/1977 | United Kingdom . |
| 1500907 | 2/1978 | United Kingdom . |
| 1506709 | 4/1978 | United Kingdom . |
| 1524007 | 9/1978 | United Kingdom . |
| 2033987 | 5/1980 | United Kingdom | 188/73.3 |
| 1574131 | 9/1980 | United Kingdom . |

Primary Examiner—Douglas C. Butler
Attorney, Agent, or Firm—Sughrue, Mion, Zinn, Macpeak & Seas

[57] ABSTRACT

A disc brake of a type having a caliper member which is guided for axial movement on a carrier member relative to a disc is provided with a pair of freely rotatable pins which extend through axially directed bores in the caliper member. A pair of coil springs are connected to the opposite ends of each pin with the opposite ends of the coil springs being anchored to the carrier member so that the caliper is freely slidable on the pins in spite of any deformation of the carrier member. The caliper member is restrained from excessive movement by a pair of retainer members overlying the opposite ends of the caliper member and which are secured to the opposite ends of the carrier member.

1 Claim, 8 Drawing Figures

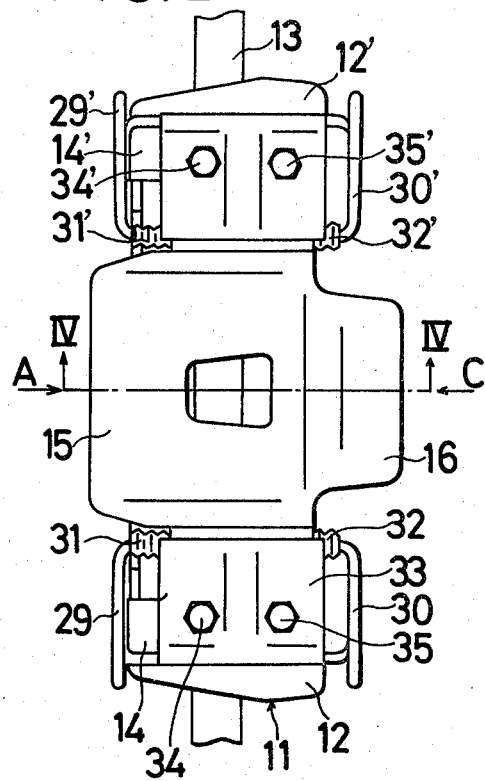
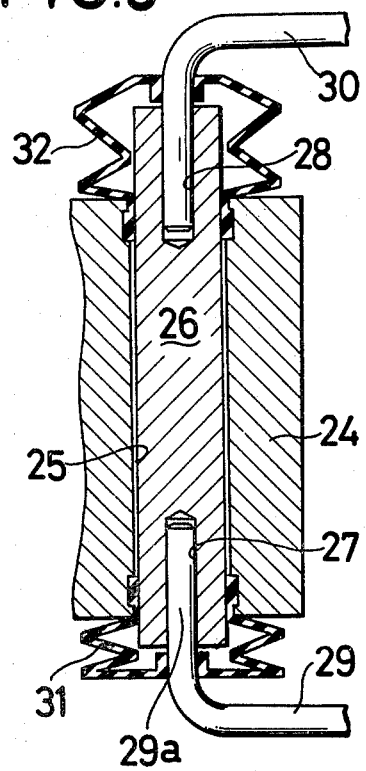
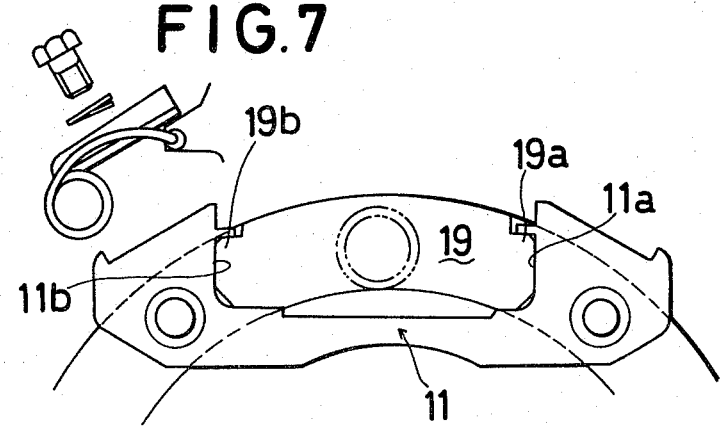

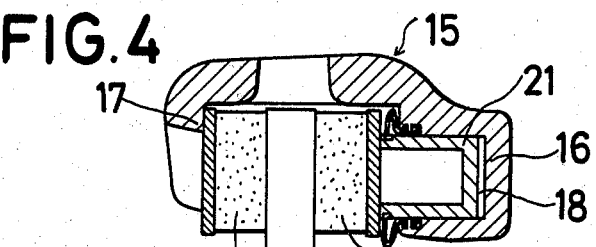
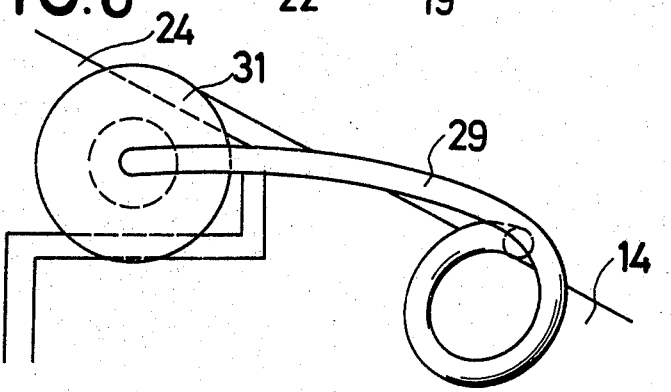
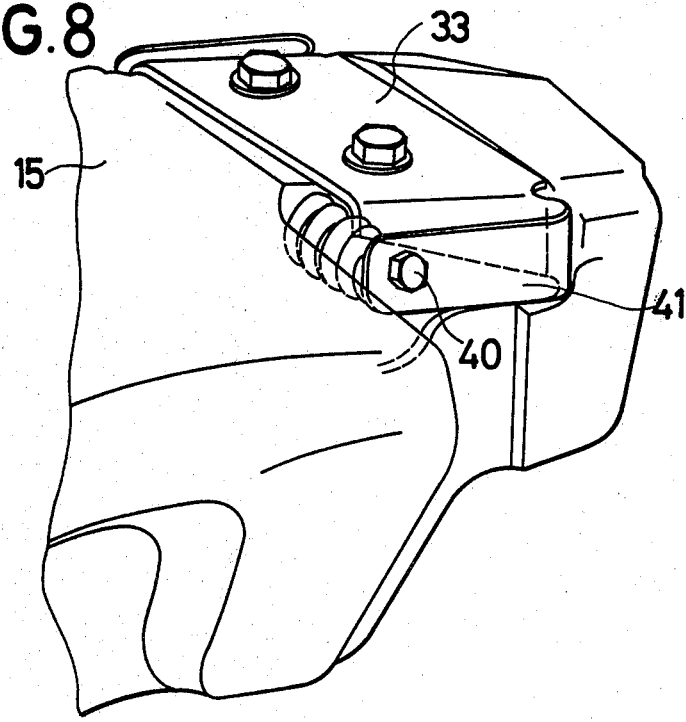

SLIDING CALIPER DISC BRAKE

BACKGROUND OF THE INVENTION

1. Field of the Invention

The present invention relates to a sliding caliper disc brake and more specifically to a guide means for slidably mounting the caliper member on the carrier member of the disc brake assembly.

2. Prior Art

The problem with known guide means is the difficulty of locating the caliper member adequately against spurious movements under heavy vibration and braking while at the same time ensuring that the caliper member can slide freely relative to the carrier member.

It has been proposed in the past to mount the caliper member on the carrier member by means of a pair of pins which are slidable in respective openings in one of the members and are secured to the other of the members. However, in such constructions, it is necessary to center the pins very accurately in their openings to avoid binding in operation resulting in differential braking at different vehicle wheels arising from different proportions of the available hydraulic line pressure needed to overcome the initial resistance to sliding. Furthermore, under heavy braking, the carrier member may deflect to produce intermittent binding of the pins in their openings resulting in stress to the pins and parts of the caliper member.

In an attempt to solve this problem in the past, the pins have been encased within rubber bushings. While this reduces the likelyhood of binding there is a tendency for brakes to heat up which may cause deterioration of the rubber. In the U.S. Pat. to Unterberg No. 4,093,044 granted June 6, 1978, the guide means for the caliper includes a pair of pins disposed with a snug sliding fit in a pair of openings in the carrier member. The caliper is connected to the pin by means of a resilient element adapted to flex so as to absorb the loads produced by distortion of the carrier member and thereby resist binding of the pins in the opening.

SUMMARY OF THE INVENTION

The present invention provides a new and improved sliding caliper disc brake which overcomes all of the aforementioned difficulties associated with caliper guide means. According to the present invention, the guide means are supported by spring means to prevent deformation of the guide-pin means in spite of deformation of the carrier member.

The present invention provides a new and improved sliding caliper disc brake wherein a pair of axially extending pins are slidably mounted in bores disposed at opposite ends of the caliper and a pair of coil springs connect the opposite ends of each pin to the carrier member. Retaining means are mounted at each end of the carrier member in overlying relation to the ends of the caliper to prevent excessive movement of the caliper in a circumferential or radial direction.

The foregoing and other objects, features and advantages of the invention will be apparent from the following more particular description of preferred embodiments of the invention as illustrated in the accompanying drawing.

BRIEF DESCRIPTION OF THE DRAWINGS

FIG. 2 is a plan view of the disc brake of FIG. 1.

FIG. 4 is a sectional view taken along the line IV—IV of FIG. 2.

FIG. 5 is an enlarged sectional view taken along the line V—V of FIG. 3.

FIG. 6 is an enlarged view of the portion encircled at B in FIG. 3.

FIG. 7 is a partial side view of the disc brake of FIG. 2 as viewed in the direction of the arrow C.

FIG. 8 is a partial perspective view of another embodiment of a disc brake according to the present invention.

DETAILED DESCRIPTION OF THE INVENTION

Figure 1:
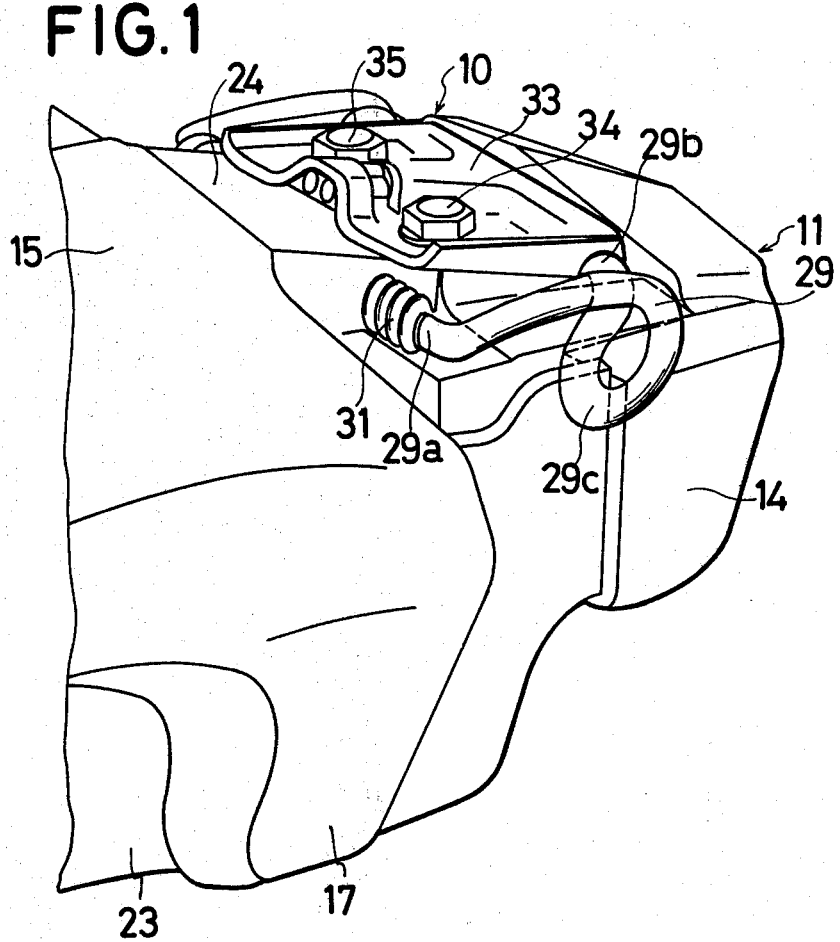
FIG. 1 is a partial perspective view of one embodiment of a sliding caliper disc brake according to the present invention.

Referring to now to FIGS. 1-6, the disc brake 10 is provided with a carrier member 11 having a substantially U-shaped configuration which is adapted to be fixedly mounted to the frame of the vehicle. The carrier member 11 has a pair of brackets 12, 12' which oppose each other and from which a pair of arms 14, 14' extend respectively across the periphery of a rotatable disc 13.

A caliper member 15 is adapted to straddle a portion of the periphery of the rotatable disc 13 between the brackets 12, 12'. The caliper member 15 has a limb portion 16 and a bifuricated portion 17 disposed on opposite sides of the rotatable disc 13. The limb portion 16 is provided with a blind bore in which a piston 21 is slidably mounted thereby forming a pressure chamber 18 within the bore. Suitable means (not shown) are provided for supplying a pressurized hydraulic fluid to the pressure chamber. The piston 21 abuts against a directly actuated friction pad 19 and an indirectly actuated pad 22 is disposed in engagement with the bifuricated portion 17. The opposite ends 19a, 19b of the first pad 19 are fitted in opposed recess 11a, 11b respectively of the carrier member 11. The opposite ends of the second pad 22 are disposed in abuttment with the arms 14, 14' respectively of the carrier member.

A pair of lugs 24, 24' are provided on opposite ends of the caliper member 15. The lugs 24, 24' are integral with the caliper member 15. The lug 24 is provided with a bore 25 in which a guide pin 26 is slidably mounted. The guide pin 26 is provided with blind bores 27 and 28 at opposite ends thereof. One end 29a of a spring 29 is secured in bore 27. The other end 29b of the spring 29 is disposed parallel to the end 29a and a coiled intermediate portion 29c interconnects both end portions 29a and 29b. A spring 30 having a configuration similar to that of spring 29 is provided with one end secured in bore 28 and the other end disposed parallel thereto. The other ends of both springs 29 and 30 are fixed to the arm 14 by means of a retainer 33 secured on the bracket 12 by means of bolts 34 and 35. Flexible boots 31 and 32 are provided to exclude dirt from the bore 25.

The opposite end of the disc brake assembly having the lug 24' thereon is configured identical to the end having the lug 24 thereon. That is to say, the end having lug 24' is provided with a blind bore 25', a guide pin 26', spring 29' and 30', flexible boots 31' and 32', a retainer 33' and a pair of bolts 34' and 35' which correspond to the blind bore 25, the guide pin 26, the springs 29 and 30, the flexible boots 31 and 32, the retainer 33 and the pair of bolts 34 and 35, respectively.

Thus, the caliper member 15 is biased upwardly by the springs 29, 30, 29' and 30' to provide a clearance between the lugs 24, 24' of the caliper member 15 and the arms 14, 14' of the carrier member 11.

In operation, when brake fluid is applied to the pressure chamber 18, the piston 21 will be forced axially in one direction so that the first pad 19 is engaged with one face of the disc 13. When the first pad 19 is engaged with one face of the disc 13, a reaction is generated in the opposite direction and the second pad 22 is engaged with the other face of the disc 13. Thus, the opposite surfaces of the disc 13 are gripped by the opposed friction pads 19 and 22 to brake the rotation of the disc.

Figure 3:
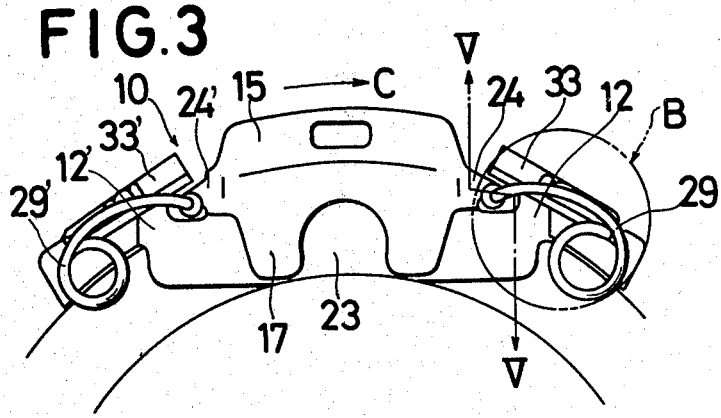
FIG. 3 is a side view of the disc brake shown in FIG. 2 as viewed in the direction of the arrow A.

During the above operation, assuming that the disc 13 rotates clockwise as is indicated by the arrow C in FIG. 3, the bracket 12 is spread outwardly due to braking torque thereon. Since the guide pin 26 is not fixed directly to the bracket 12 but is fixed indirectly through springs 29 and 30, the caliper member 15 would tend to rotate in the same direction but excessive rotation of the caliper member 15 would be prevented by the retainers. Thus, the guide pin 26 is not deformed in spite of the deformation of the bracket 12 upon brake operation and the caliper 15 is perfectly free to be returned to its original position upon brake release.

According to a modified form of construction, the spring 29 may be replaced by a metal spring plate member 41 which is formed integrally with the retainer 33. The free end of the spring plate 41 is secured to the end of the slidable pin 26 by means of the bolt 40 as seen in FIG. 8. Similar spring plates would be substituted for the other coil springs according to the modified form of construction.

While the invention has been particularly shown and described with reference to preferred embodiments thereof, it will be understood by those in the art that the foregoing and other changes in form and details may be made therein without departing from the spirit and scope of the invention.

What is claimed is:

1. A sliding caliper disc brake comprising a rotatable disc, a carrier member disposed at one side of said disc and having a pair of arms extending across the periphery of said disc, a caliper member straddling a portion of the periphery of said disc between said arms, brake pad means disposed on opposite sides of said disc and actuator means associated with said caliper means for moving said pads into engagement with said disc, a pair of axially directed bores disposed in opposite ends of said caliper member, pin means slidably disposed in said bores for guiding said caliper member for movement relative to said disc in the axial direction thereof, spring means comprised of four coil springs, each of said springs having a first end portion secured to a respective end of said pin means, a second end portion fixed to respective arm and an intermediate portion having at least one coil winding for supporting said pin means on said carrier member and for biasing said caliper radially outwardly relative to said disc and a pair of retaining means secured to said arms and disposed in overlying relation to the ends of said caliper member to limit radial movement of said caliper member.

* * * * *